United States Patent [19]
Skotinkov

[11] Patent Number: 5,755,382
[45] Date of Patent: May 26, 1998

[54] SELF-PROPELLED SPRAYER

[76] Inventor: Andrey V. Skotinkov, 1275 Fifield Pl., St. Paul, Minn. 55108

[21] Appl. No.: 696,253

[22] Filed: Aug. 13, 1996

[30] Foreign Application Priority Data

Aug. 14, 1995 [BY] Belarus .................................. 950819

[51] Int. Cl.⁶ .................................. B05B 3/18; B05B 1/20
[52] U.S. Cl. ........................ 239/161; 239/165; 239/176
[58] Field of Search .............................. 239/146, 147, 239/159–161, 163–167, 169, 176, 722, 723, 726, 727, 732, 735, 739, 741–744, 67, 69, 99

[56] References Cited

U.S. PATENT DOCUMENTS

| 3,662,776 | 5/1972 | Bryant et al. ............... 239/742 X |
| 3,866,834 | 2/1975 | Shannon ........................ 239/167 |
| 4,365,748 | 12/1982 | Emrich ....................... 239/742 X |
| 5,337,959 | 8/1994 | Boyd ............................ 239/69 X |

FOREIGN PATENT DOCUMENTS

| 118366 | 9/1984 | European Pat. Off. ........... 239/167 |
| 356073 | 7/1922 | Germany ....................... 239/742 |
| 378199 | 4/1973 | U.S.S.R. ....................... 239/742 |
| 1115686 | 9/1984 | U.S.S.R. ....................... 239/742 |

Primary Examiner—Lesley D. Morris
Attorney, Agent, or Firm—Faegre & Benson LLP

[57] ABSTRACT

A self-propelled sprayer having individually rotatable wheels and a pair of wing extensions for a spraying boom, with the wheels able to be turned in line with the boom for transport or turned 90 degrees for spraying, with a GPS receiver to determine the geophysical position of the sprayer, a saddle tank for chemicals to be sprayed, and a mechanism to elevate and depress individual wings of the boom, and a mechanism to adjust ground clearance and leveling of the sprayer for operation on slopes. The chemical tank has a plurality of expandable bladders therein to allow various proportions of chemicals to be carried while maximizing the capacity of the tank.

16 Claims, 9 Drawing Sheets

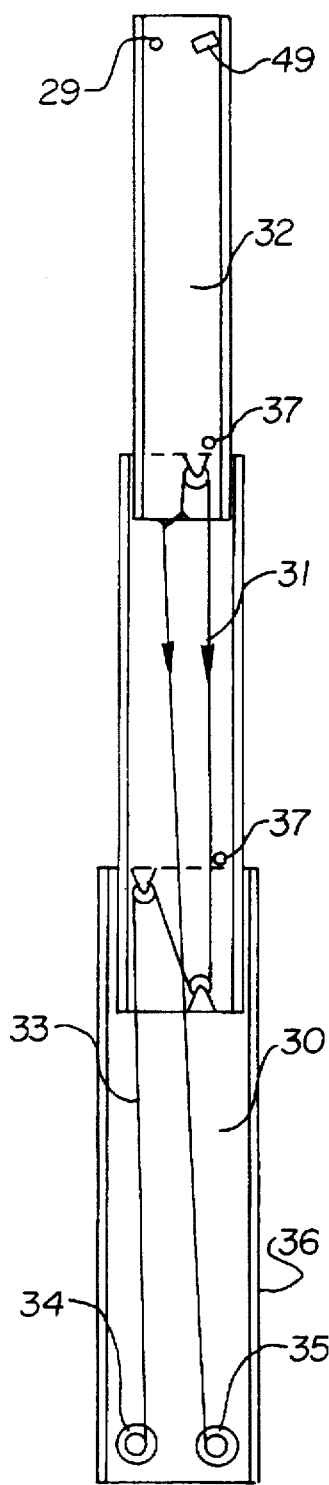
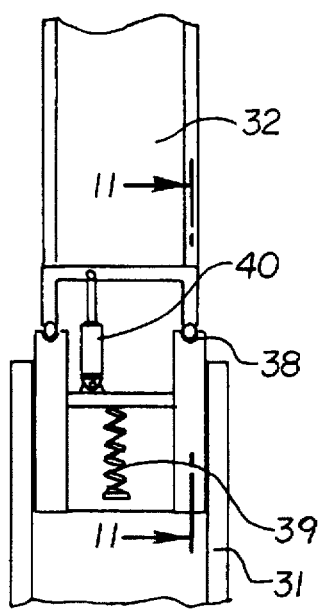
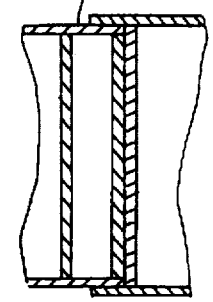
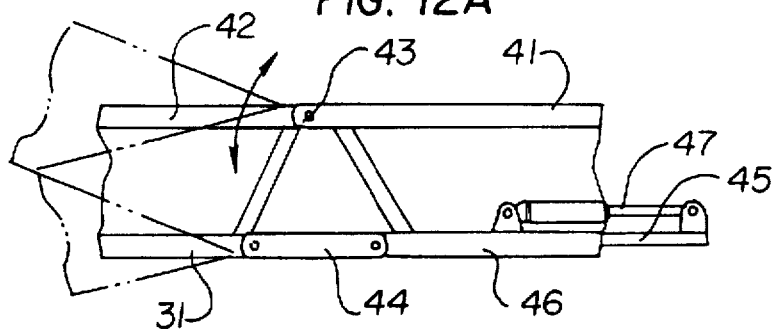
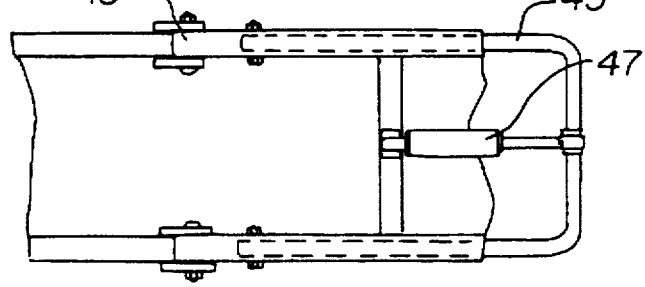

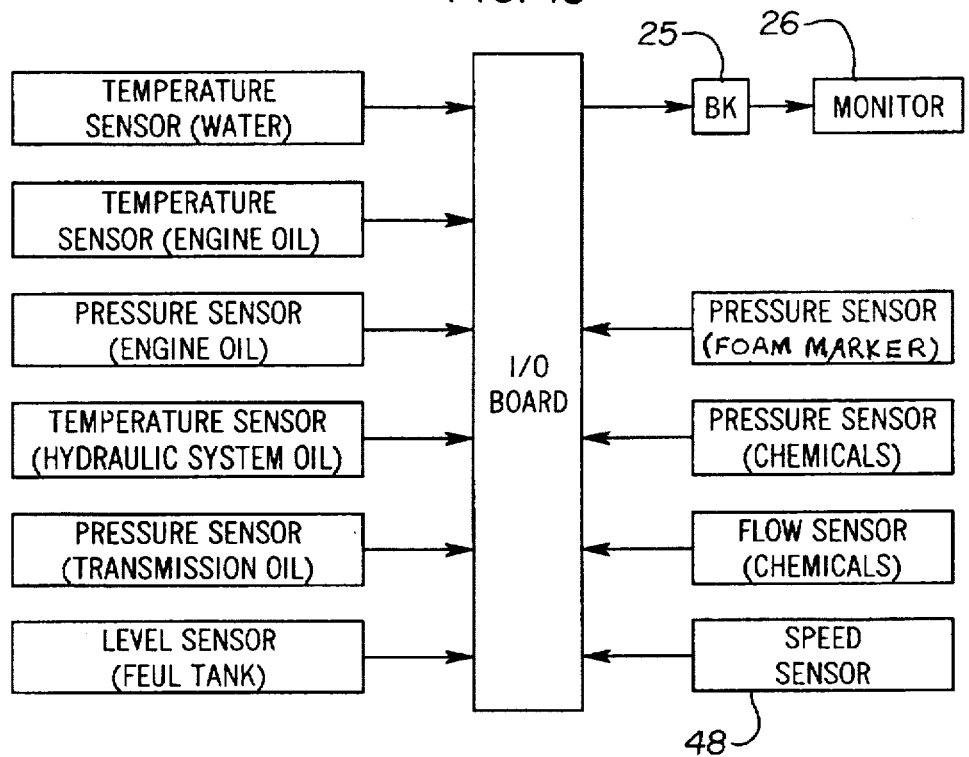
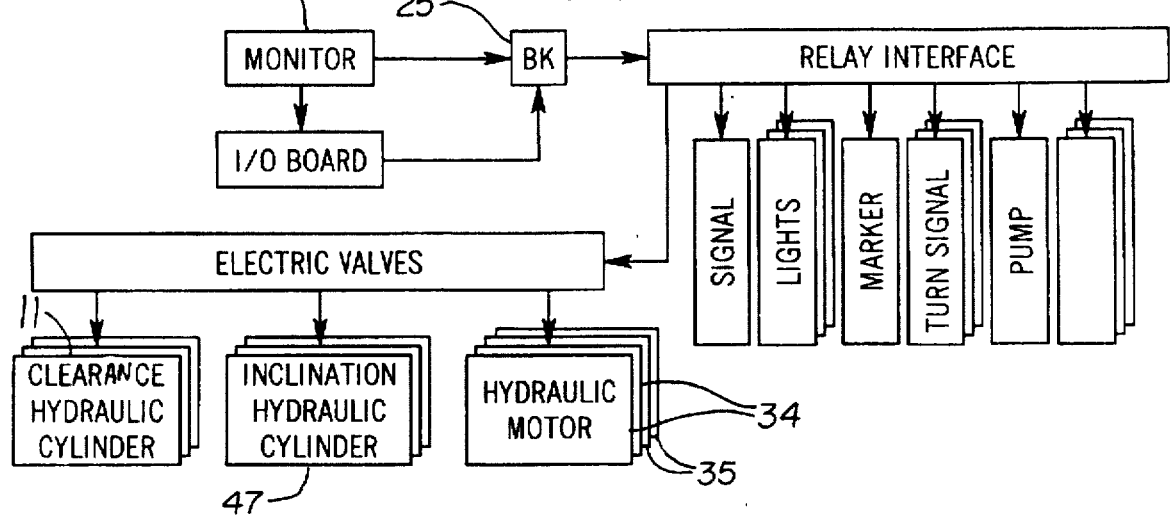

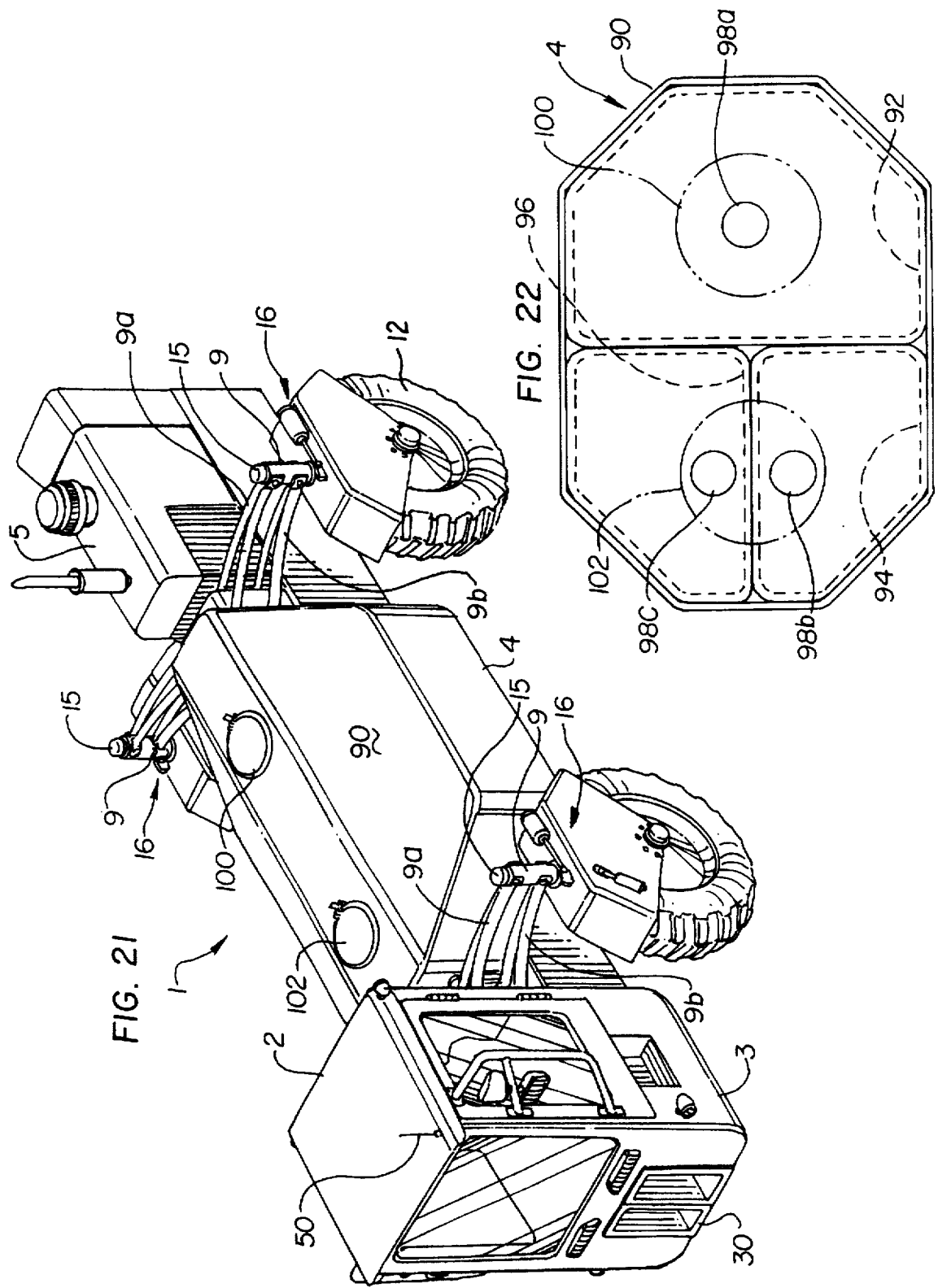

SELF-PROPELLED SPRAYER

BACKGROUND OF THE INVENTION

The present invention relates to sprayers, more particularly, to automated, self-propelled sprayers.

Existing sprayers have low productivity because of a small length of the boom, low speed, taking too much time for stoppages on folding and unfolding the boom and turning around at the end and beginning of each run and too much time for processing the turning strips. Booms on existing equipment require folding during turns due to the risk of breaking the boom by inertial forces or possible obstacles such as trees, bushes, poles, etc. In most cases, especially during processing row crops, turning on a planted field is impossible and folding/unfolding the boom is a real factor in reducing productivity of the sprayer. The necessity of low speed arises from the inefficient design of the suspension, the parameters of which cannot be adjusted to a changing relief of a field or weight of the sprayer. Thus, increasing the speed of existing sprayers causes increasing boom oscillations resulting in the decrease of quality of spraying and sometimes even boom breakage.

SUMMARY OF THE INVENTION

The present invention arises from the realization that it is possible to increase productivity by applying a longer boom, increasing the speed of movement using an improved suspension, decreasing down time by accelerating boom folding, and decreasing turn-around time at the start and end of runs by an elimination of processing the turning strips owing to the new system of turning In addition, an increase in the quality of application of chemicals is possible owing to exclusion of the turning strips, the possibility of processing inconvenient spots, the multi-sectional boom, decreasing the oscillation of the boom, and the possibility of applying chemicals in accordance with a program. Furthermore, it is possible to reduce the unproductive expenditure of chemicals due to the multi-sectional boom, the elimination of turning strips, and the automated system of application. The present invention also eases and improves the working conditions for the operator by introducing electronic control and management systems, decreasing vibration and oscillation by an improved suspension, decreasing the level of noise with a rear mounted engine, and introducing a new cabin with better visibility and without a steering column and wheel, with a new instrument panel, and with a joystick and monitor screen.

The self-propelled sprayer of the present invention solves these problems using a frame with a cabin fixed thereon, with the cabin having a rotating operator's seat, a vertical acceleration sensor, an on-board computer with software, a digital-to-analog interface (I/O board), a relay interface (RI), a monitor and a joystick, a global positioning system (GPS) receiver with satellite antenna mounted on the roof of the cabin, fuel tanks placed under the cabin, a complex multi-sectional monotank of saddle form, an engine with a hydrostatic transmission and a block of electro-hydraulic valves, an air compressor with receiver and electric valve, an independent parallelogram lever suspension mounted to the frame and jointly connected to the frame via specially configured levers installed between the parallelogram, four hydraulic cylinders for changing the ground clearance (with each cylinder having a cylinder position sensor), four wheels, each driven by a fork mounted hydrostatic motor, each wheel having a separate sensor and mechanism for turning, each wheel having a shield, with a speed sensor mounted on one shield, a pneumatic spring with a pressure sensor and shock absorber for each pair of wheels located between the two specially configured levers, a telescopic boom with two wings and a vertical acceleration sensor on each, the booms mounted between the wheels inside the frame in the center of the sprayer.

The various sensors for speed, wheel turning, the joystick, the on-board computer, the I/O board, the relay interface, the electric valves, and the hydraulic cylinders for turning the wheels are connected in a system of turning and changing the direction of movement.

The sensors for air pressure in the air springs, speed, acceleration, ground clearance, the on-board computer, the I/O board, the relay interface, the electric valves, the receiver and the air springs are connected in an automated system for suspension management.

The rotating operator chair with its turning mechanism is fixed to the floor of the cabin. Chair arms are equipped with a flip-up monitor and joystick, with the on-board computer preferably installed under the seat.

The telescopic boom has a middle nonmovable section (the frame of the sprayer divided along a longitudinal axis into two equal compartments; two movable sections of the boom forming its two wings are placed in each of them. Each wing has a pulley/cable system mounted on its sections to pull the sections in and out by means of hydraulic motors fixed on the nonmovable section. In addition, each section of the boom is equipped with a latch controlled by a solenoid. Each outer section is equipped with a breakaway mechanism of two disengageable half-cylinder supports with a spring and shock absorber. Each of the intermediate moveable sections is divided into inside and outside parts, with upper girders jointly connected by means of a horizontal axle perpendicular to the axis of the section. The outside part of the lower girder is connected by a joint with two intermediate rods, the inside ends of which are jointly connected with ends of a moveable frame installed in the lower girder of the inside part in a guide and connected with the inside part of the middle section by a hydraulic cylinder. Video cameras are fixed on the end of each wing and connected by a cable to a video card installed in the on-board computer. All sensors for the control of the various functions of the sprayer (pressure, temperature, volume, circuit, position, etc.) are connected by cables with the I/O board, the on-board computer and monitor and form a sprayer control system. The screen of the monitor is connected through the on-board computer, the I/O board, and the relay interface to the lights, turn signals, latches, and electric valves to form a management system for the boom, ground clearance, the foam marker, signalling and illumination. The GPS receiver together with its satellite antenna, the on-board computer, the I/O board and relay interface, the electric valve for flow control and a software program form a chemical application system.

BRIEF DESCRIPTION OF THE DRAWINGS

FIG. 10 is a schematic view of the pulley/cable arrangement for extending and retracting the boom according to the present invention.

FIG. 11a is a fragmentary schematic view of a breakaway mechanism for the boom according to the present invention.

FIG. 11b is a detail section view taken along line A—A of FIG. 11a.

FIG. 12a is a fragmentary side elevation view of a boom wing inclination mechanism according to the present invention.

FIG. 12b is a top plan view of the inclination mechanism of FIG. 12a.

FIG. 15 is a block diagram of the work control system according to the present invention.

FIG. 16 is a block diagram of the management system for the boom, ground clearance, signalling, illumination, and foam marker according to the present invention.

FIG. 21 is a perspective view of the sprayer of the present invention.

FIG. 22 is a top plan view of a chemical tank arrangement useful in the practice of the present invention.

DETAILED DESCRIPTION OF THE PREFERRED EMBODIMENTS

Figure 1:
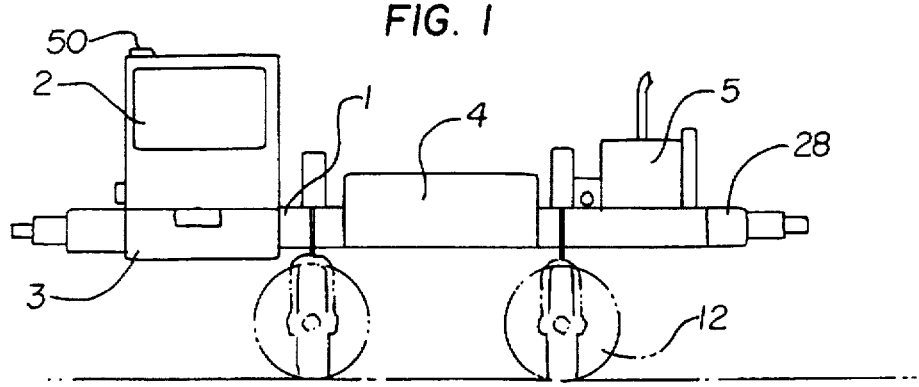
FIG. 1 is a side elevation view (schematic representation) of an automated self-propelled sprayer according to the present invention.
Figure 2:
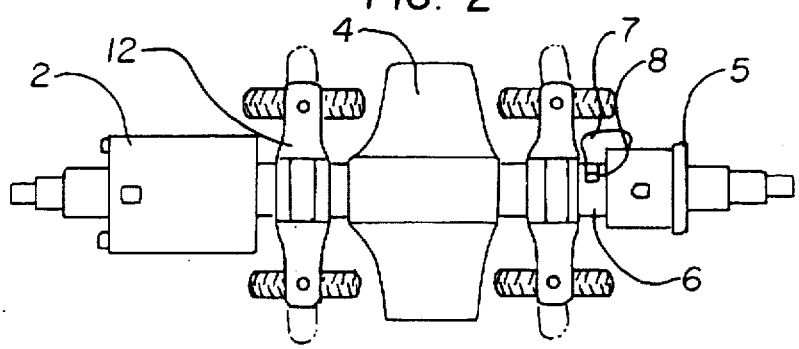
FIG. 2 is a top plan view of the sprayer of FIG. 1

FIGS. 1, 2, and 21 are views of the automated self-propelled sprayer (hereinafter "sprayer") according to the present invention. The sprayer includes a frame 1 with a cabin 2 fixed on it; fuel tanks 3 placed under the cabin 2; a complex multi-sectional monotank of saddle form 4 with sections for oil, chemicals, and liquid for tank cleaning (details of which are shown and described in more detail with respect to FIG. 22, infra); an engine 5 with a hydrostatic transmission and a block of electro-hydraulic valves; an air compressor 6 with a receiver 7 and a plurality of electric valves 8.

Figure 3:
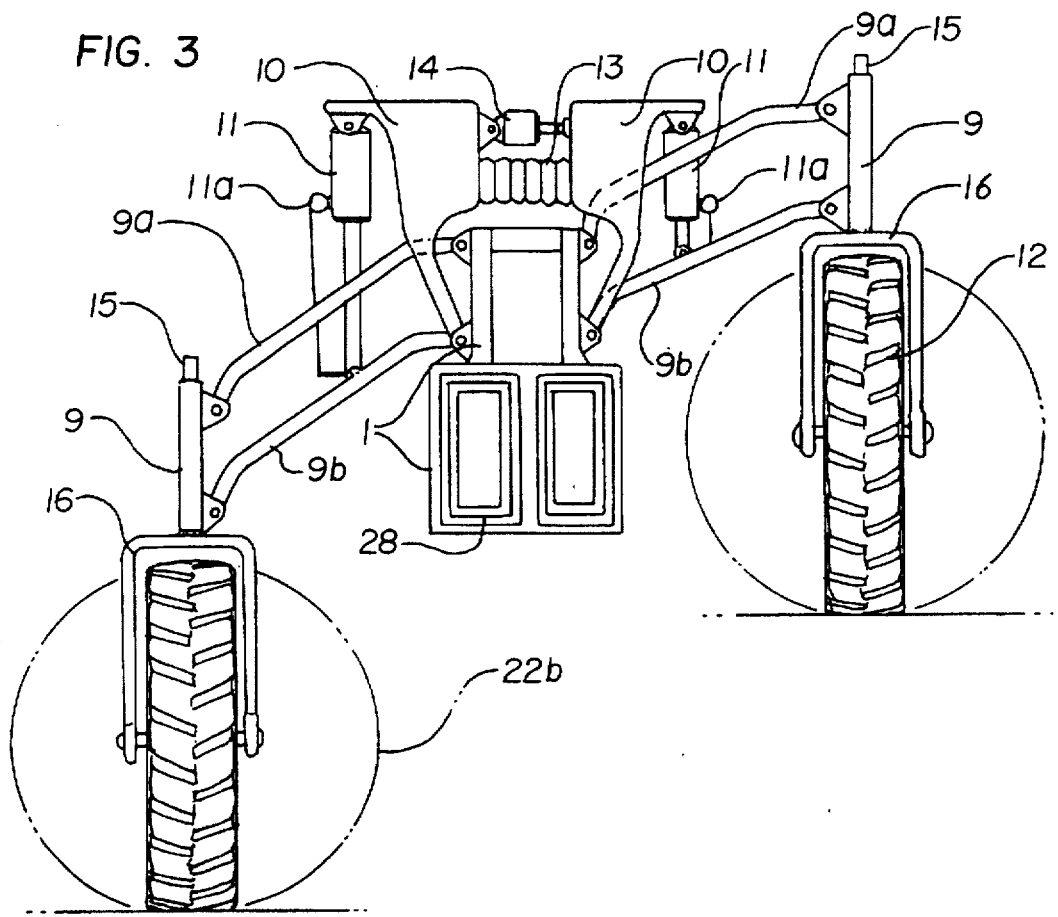
FIG. 3 is an end elevation view of the sprayer of FIG. 1 with the suspension configured to support the sprayer in a level condition on uneven terrain.

Referring now also to FIG. 3, frame 1 is supported by means of four independent parallelogram lever suspensions. Each suspension includes two (upper and lower) parallelogram levers 9a and 9b pivotably fixed to frame 1 in a vertical plane. An outboard end of each of levers 9a and 9b is pivotably fixed to a vertical sleeve 9 and the other (inboard) end of each is pivotably connected to the frame 1. The inboard ends of each lower lever 9b are pivotably connected with a specially configured frame lever 10 to the frame 1. Each of the lower levers 9b is also connected through a hydraulic cylinder 11 to one of the frame levers 10 for changing the ground clearance of sprayer 1. Cylinder position sensors 11a are installed between frame levers 10 and levers 9b. A pneumatic spring 13 and a shock absorber 14 are mounted between each of the left and right specially configured frame levers 10 for each pair of wheels 12. Each wheel 12 is installed with a hydrostatic driven motor in a pivotable wheel mounting assembly 16 which includes a vertical axle 15, a fork 15a and a shield 16a, all of which may be seen in more detail in FIGS. 4, 5, 6 and 7. Each wheel 12 has a separate turning or steering sensor 17 fixed on pivotable assembly 16.

Figure 4:
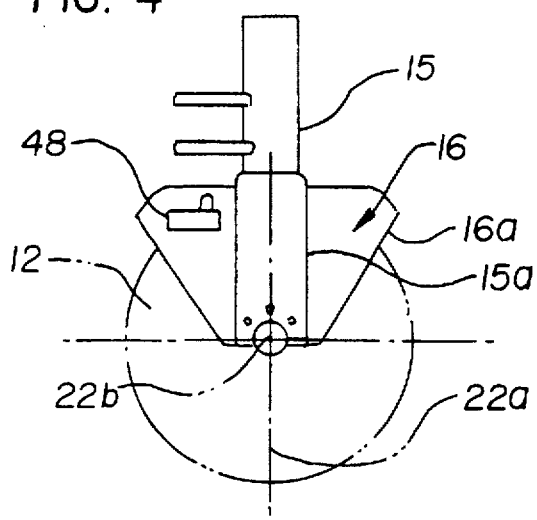
FIG. 4 is a side elevation view of a sprayer wheel assembly according to the present invention.
Figure 5:
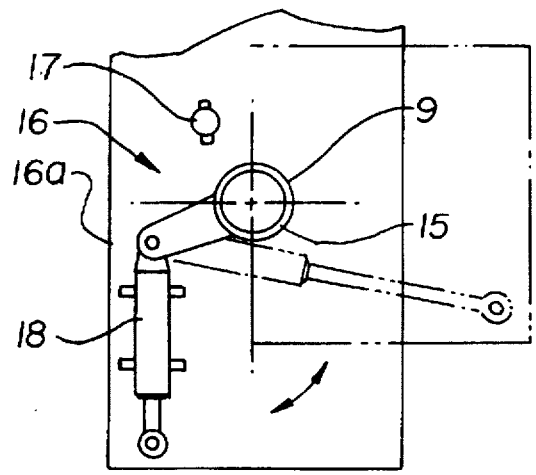
FIG. 5 is a top plan view of a wheel turning mechanism using a hydraulic cylinder according to the present invention.
Figure 6:
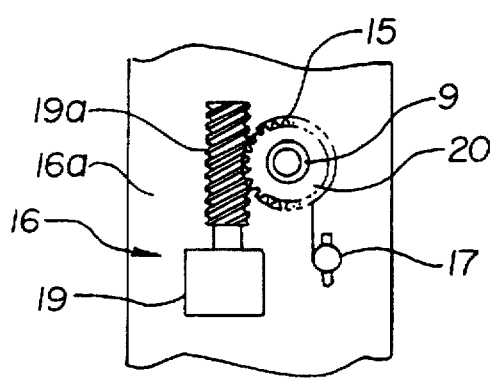
FIG. 6 is a top plan view of a worm-gear embodiment for the wheel turning mechanism of the present invention.
Figure 7:
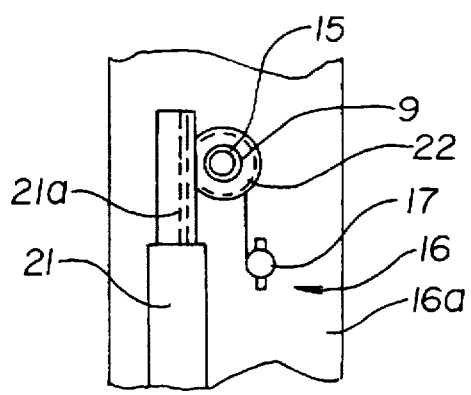
FIG. 7 is a top plan view of a rack-gear embodiment for the wheel turning mechanism of the present invention.

Wheel turning (steering) mechanisms may be of various types such as: a) a hydraulic cylinder 18 fixed between sleeve 9 and pivotable assembly 16 as shown in FIG. 5; b) a worm-gear type (FIG. 6) with a hydraulic motor 19 driving a worm 19a fixed on assembly 16 and a gear 20 fixed on sleeve 9; c) a rack and pinon gear type (FIG. 7) with a hydraulic cylinder 21 fixed on assembly 16 driving a rack gear 21a engaged with a pinon gear 22 fixed on sleeve 9 to turn (steer) wheel 12. Each of the above steering mechanisms preferably provide at least 120 degrees of turning relative to sleeve 9 and frame 1. The wheel forks 15a are made so that their axis of symmetry and turning (steering) rotation 22a coincides with axle 15 of the wheel mounting assembly 16; it is also to be understood that axis 22a intersects axis 22b of wheel rotation. A speed sensor 48 is installed on one of the pivotable assemblies 16, as shown in FIG. 4.

Figure 8:
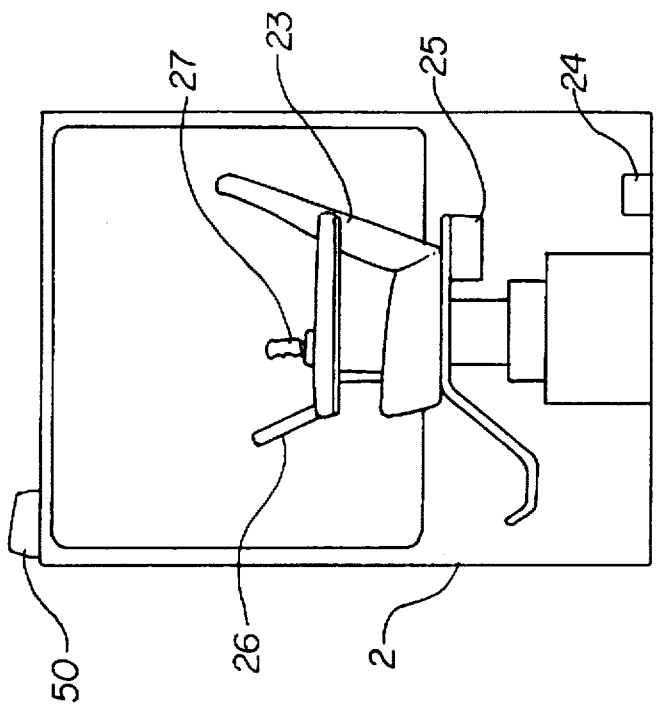
FIG. 8 is simplified side plan view of the cabin according to the present invention.

Referring now to FIG. 8, cabin 2 has a rotatable operator's chair 23 mounted on the floor of the cabin by a turning and suspension mechanism (not shown). Cabin 2 also includes an acceleration sensor 24, the on-board computer (BK) 25, the I/O board, the relay interface (RI), along with associated software, all of which is preferably mounted under chair 23. Chair arms are equipped with a flip-up monitor 26 and a joystick 27.

Figure 9:
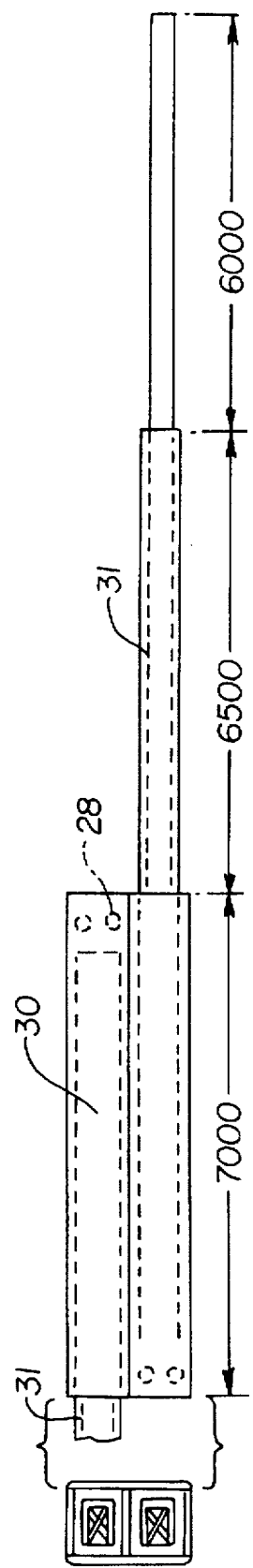
FIG. 9 is a top plan view of a telescopic boom according to the present invention.

Referring now most particularly to FIGS. 9, 10 and 1, a telescopic five section boom 28 preferably has an acceleration sensor 29 mounted on each wing thereof. Each wing of the boom is mounted inside and generally centered in frame 1 between wheels 12. Telescopic boom 28 has a non-movable middle section 30 (frame 1 of the sprayer) with a length of preferably 7 meters, and is divided along its longitudinal axis into two equal compartments. Within each compartment is installed inner and outer telescoping sections 31, 32, with lengths of 6.5 and 6 meters, respectively. Each section has electric valves (not shown) for switching a flow of chemicals ON and OFF. Each wing of the telescopic boom 28 has a pulley/cable system 33 (FIG. 10) mounted on its sections 30, 31 and 32 to extend sections 31 and 32 outwardly by means of a hydraulic motor 34 fixed on the non-moving section 30. Each wing also has a cable 36 and hydraulic motor 35 to retract section 31 and 32. Each of telescopic sections 31 and 32 of the boom 28 has a latch 37 controlled by a solenoid (not shown).

Referring now also to FIGS. 11a and 11b, each outer section 32 is equipped with a break-away mechanism having two disengageable half-cylinder supports 38. The mechanism is compressed by a spring 39 and also includes a shock absorber 40.

Referring now also to FIGS. 12a and 12b, each of the inner or intermediate movable sections 31 is divided into an inboard part 41 and an outboard part 42. Each of parts 41 and 42 has an upper girder jointly connected by means of a horizontal axle 43 perpendicular to the axis of section 31. A lower girder of the outboard part 42 is connected by a joint with two intermediate rods 44, the inboard ends of which are jointly connected with the ends of a movable frame 45 installed in a lower girder of the inboard part 41 in a guide 46 and connected with the inboard part 41 of the intermediate section 31 by means of a hydraulic cylinder 47.

Referring now again to FIG. 4, a speed sensor 48 is preferably fixed on left front pivotable assembly 16.

Referring now again to FIG. 10, videocameras 49 are fixed on the end of each wing of the boom 28. The videocameras are connected by a cable (not shown) to a video card (also not shown) installed in the on-board computer 25.

As may be seen in FIGS. 1, 8, and 21, a satellite antenna 50 is installed on the roof of cabin 2.

Figure 13:
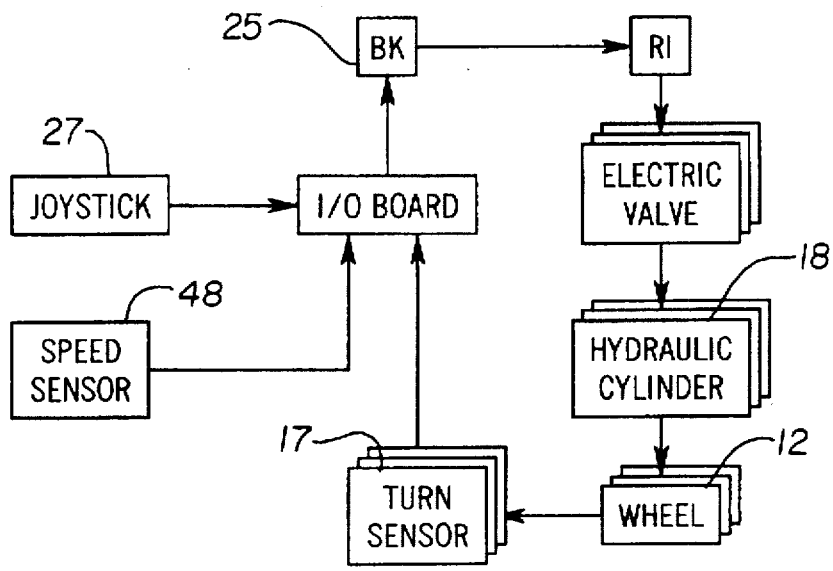
FIG. 13 is a block diagram of the system for controlling turning and direction of movement.

Referring now most particularly to FIG. 13, the sensors for speed, wheel turning (steering), joystick 27, on-board computer 25, I/O board, relay interface (RI), electric valves, and hydraulic cylinders 18 for wheel turning (steering) are connected in a system for turning (steering) and changing the direction of movement.

Figure 14:
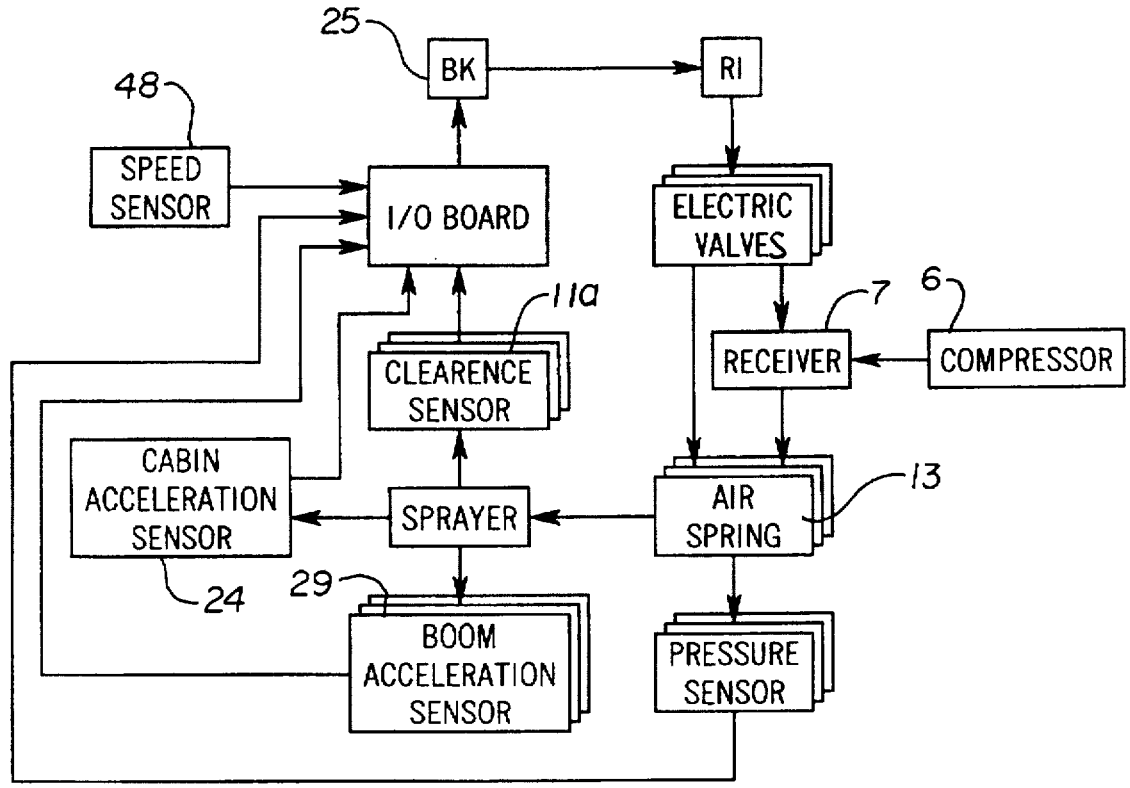
FIG. 14 is a block diagram of the automated suspension management control system according to the present invention.

Referring now to FIG. 14, the sensors for air pressure in the air springs 13, speed, acceleration in the cabin and on the wings of the boom, position of the ground clearance changing cylinders 11a, the on-board computer 25, software programs of suspension management, I/O board, RI, electric valves, receiver 7, compressor 6, and air springs 13 are connected in an automated system for suspension management. Due to such a design, the sprayer has an active suspension.

Referring now to FIG. 15, all sensors for operation of the functioning of the sprayer (pressure, temperature, volume, circuit, position, etc.) are connected by cables with the I/O board, the on-board computer 25, RI, and monitor 26 and form a work control system for the sprayer.

Referring now to FIG. 16, the screen of the monitor is connected through the on-board computer 25 with lights, turn signals, latches 37, electric valves, and forms a management system for the boom 28, ground clearance, foam marker, signalling and illumination.

Figure 17:
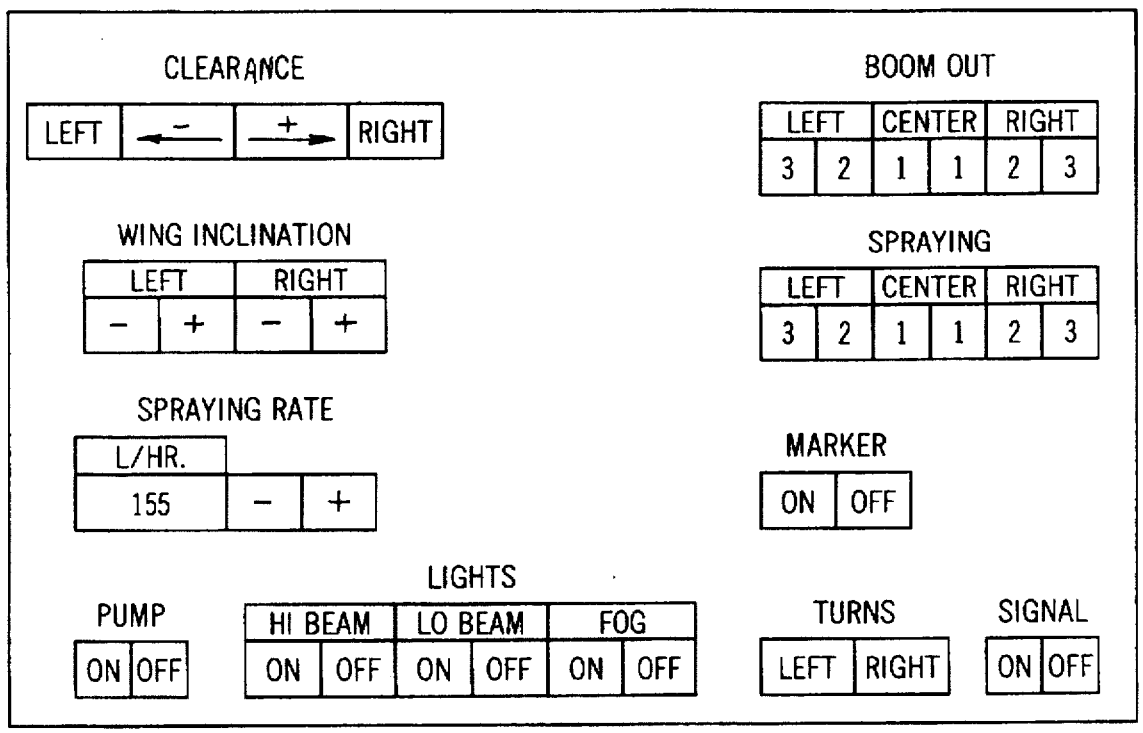
FIG. 17 is a view of the monitor screen with pictograms for the work control system according to the present invention.

Referring now to FIG. 17, a view of corresponding pictograms on the monitor screen for managing the working process of the sprayer may be seen.

Figure 18:
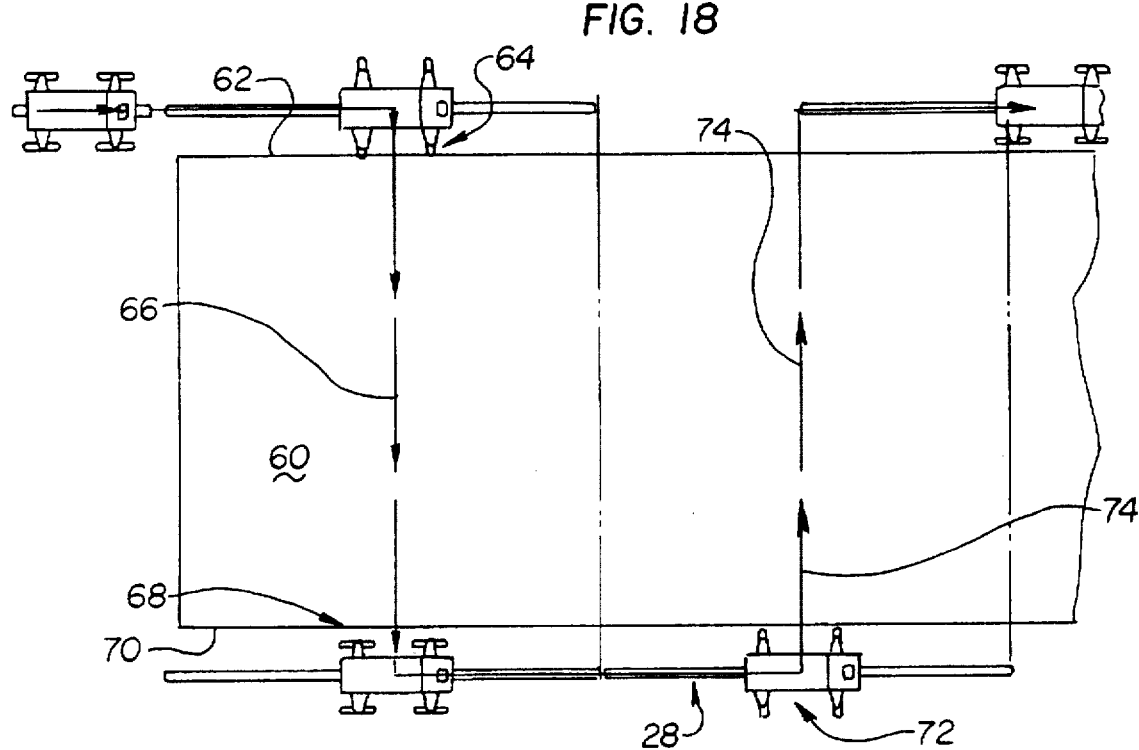
FIG. 18 is a top plan view showing sprayer movement during field processing according to the present invention.

The operation of the sprayer 1 is as follows. Referring now also to FIG. 18, for spraying a field 60, an operator drives the sprayer 1 along a first field edge 62 to a beginning position 64. Then by means of the joystick 27, BK 25, RI, electric valves, and hydraulic cylinders 18, wheels 12 are turned by 90 degrees, as shown in the beginning or start-of-run position 64. In this condition, the wheel base becomes wide in the direction of spraying 66. The mechanism under seat 25 turns it simultaneously with wheels 12 in the corresponding direction. After that, for instance, the operator may press on pictogram "BOOM OUT" on the monitor screen (FIG. 17) and a signal from that pictogram through BK, RI, switches the corresponding electric valves and the oil flow goes to hydraulic motors 34. Hydraulic motors 34 begin to wind the cable of the pulley/cable system 33 and extend (or "unfold") sections 31 and 32 of both wings from section 30. In the same way, by pressing on the corresponding pictogram on the monitor screen, it is possible to change ground clearance (height of spraying), move wings of the boom up or down (as shown in phantom in FIG. 12a), establish the necessary rate of spraying (if the program of applying chemicals is not used), and switch the flow of chemicals for the boom or for any of its sections ON and OFF. Then the operator moves the joystick 27 forward, presses the corresponding pictogram and begins to spray the field 60, moving the sprayer in a first spraying direction 66. Once the sprayer reaches the first end-of-run position 68, the operator presses a corresponding pictogram on monitor 26 to stop spraying, and then by means of joystick 27, turns wheels 12 back by 90 degrees as shown in the end-of-run position 68 and moves the sprayer along a second or opposite edge 70 of the field 60 to the next start-of-run position 72 where he again turns wheels 12 by 90 degrees and process of spraying is repeated along a second spraying direction 74, preferably opposite and parallel to direction 66. During this process, boom 28 stays extended or unfolded and the stops required by prior art sprayers to fold the boom in and out and processing of turning strips are for all practical purposes eliminated. The operator seat 23 turns sequentially with the wheels 12 in the corresponding direction. It is possible, depending on working conditions, to regulate the length of boom 28 by pressing the corresponding pictogram on the monitor screen (FIG. 17) to retract an unnecessary section or sections. Latches 37 with solenoids (FIG. 10) provide section-by-section length changing. As a result, the boom length can be 32, 26, 20, 19.5, 13.5, or 7 meters. The five section design of the boom 28 permits economizing in and increasing the quality of applying chemicals using the sprayer of the present invention.

Figure 19:
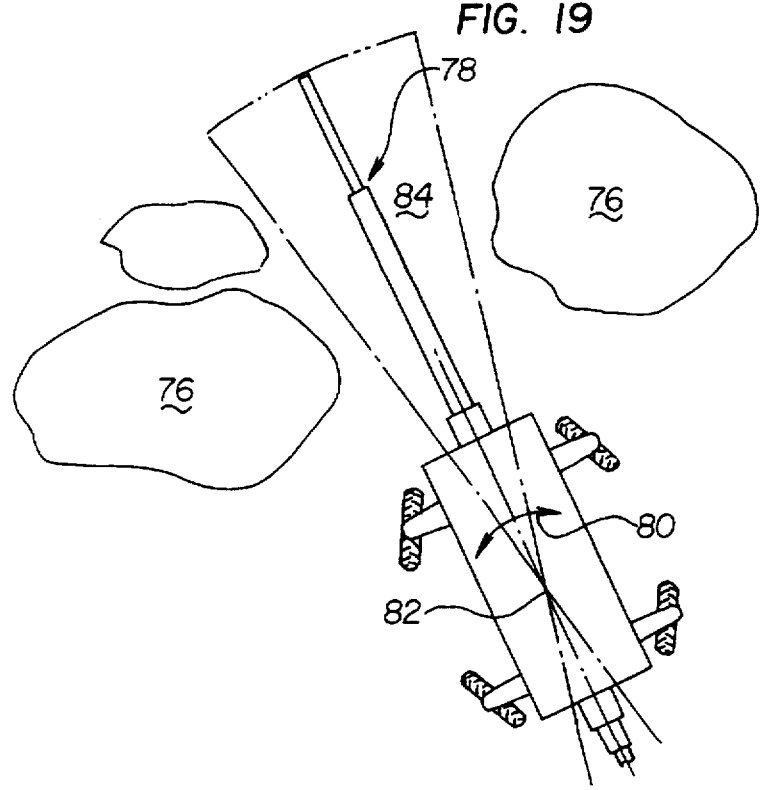
FIG. 19 is a top plan view showing sprayer movement to reach difficult-to-access areas of field processing according to the present invention.

Referring now to FIG. 19, to process inconvenient areas such as between big stones, trees, poles or puddles 76, only one wing 78 of the boom is extended, and the wheels are turned as shown to allow movement of the sprayer 1 in an arc 80 around a vertical axis of symmetry 82 to spray the desired sector 84 of the field or to control weeds outside of the field.

Figure 20:
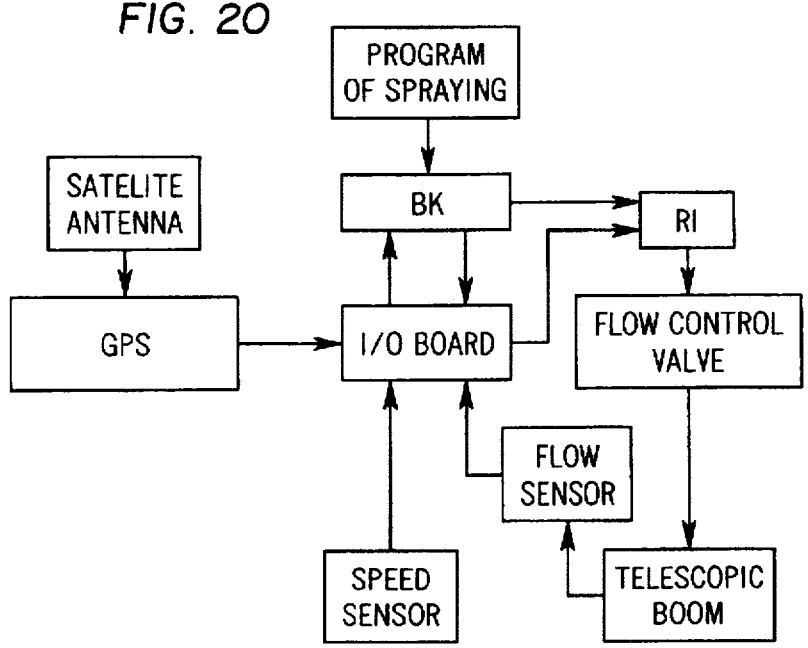
FIG. 20 is a block diagram of the automated system of applying chemicals according to the present invention.

Referring now to FIG. 20, a program of spraying, the electric valve controlling flow of chemicals to be sprayed, a flow sensor, and associated software, together with the on-board computer, I/O board, RI, and a GPS with satellite antenna together form a system for programmed spraying.

If the sprayer is to be used on a slope, it is possible to adjust the wings to the field surface, moving them up or down. For that, it is necessary to press a corresponding pictogram on the monitor screen, sending a signal to BK through the I/O board, RI to the electric valve which in turn opens the oil flow to the corresponding section of cylinder 47 (FIGS. 12a and :12b) moving frame 45 inwardly in guide 46, thus moving rods 44 and moving outboard part 42 of boom section 31 around axle 43.

If the outer part of boom section 32 meets an obstacle, it turns one of two half-cylinder supports 38 which causes compression of spring 39 thus preventing breakage of the boom. After passing the obstacle, the outer part of boom section 32 returns to the initial position by means of spring 39 and shock absorber 40 prevents a dynamic impact of the outer section on the remainder of the boom.

The suspension of the present invention has a "steep-slope" feature. When the corresponding sensor is installed, it is possible to sustain a horizontal position of the sprayer automatically or manually when working on slopes or overcoming ditches, or moving down from the road to the field. In the manual regime of work, the operator can press the corresponding pictograms of the monitor screen (FIG. 17) and equalize frame 1 (as shown in FIG. 3) to a required position by means of cylinders 11.

The management of the sprayer by means of the joystick 27 is as follows. The direction of the sprayer movement depends on the direction of joystick inclination from a neutral position. The speed of the sprayer movement depends on an angle of the joystick inclination. Inclining the joystick to the right or left turns the sprayer to the right or left. To change the direction of sprayer movement by 90 degrees, it is necessary to depress the button on the top of the joystick handle. Joystick 27 is returned to the neutral position by means of springs mounted in its body. Analog signals from joystick 27 (FIGS. 8 and 13) and speed sensor 48 (FIG. 4) through the I/O board go the BK 25 where they are compared with special data created by the turning (steering) program and signals from the turning (steering) sensors 17 (FIGS. 5, 6, and 7) coming to the BK 25 in the same way. The corresponding signals of discordance go from BK 25 through the I/O board, RI to the corresponding electric valves to actuate cylinders 18 which turn wheels 12 (FIG. 4). The software of turn management (program of turning) permits elimination of customary steering rods and kinematic discrepancies. When the operator releases joystick 27, it returns to the neutral position (due to springs) and the wheels 12 do the same. The speed of turning is limited and depends on the speed of sprayer movement. This limitation is made to prevent the turn-over of the sprayer and is put in the program of turning and changing the direction of movement.

According to the present invention, the sprayer has an active suspension managed by BK 25. This suspension has two regimes of operation: transport and spraying. In the transport condition, the active suspension operates as follows. During driving on a road, the speed sensor 48 (FIG. 4), the acceleration sensor 24 (FIGS. 8, 14) installed in the cabin 2, and the sensors of air pressure in the air springs send signals through the I/O board to the BK 25 where they are averaged (each in its own channel) during a predetermined period of time and then compared with set values in the program for a regime of movement (speed and load). Then the signal of discordance from BK 25 through the I/O board, RI goes to a corresponding electric valve connecting the air springs 13 with the receiver 7 or with atmosphere. The process of regulation continues until values from the acceleration and air pressure sensors are equal to values set in the program. For the spraying conditions (with the wheels turned 90 degrees and the boom extended) the active suspension works practically in the same way. The differences are only that in the process of suspension management for spraying, additional sensors 11a (FIG. 3) are involved and instead of cabin acceleration sensor 24, signals of sensors 29 (FIG. 10) installed on sections 32 and another program of suspension management are used. During emptying tanks 3 and 4 (FIG. 1), clearance changing or changing the height of spraying the parameters of suspension (pressure in the air springs 13) will change automatically. With such a design, the operator will stay as close as possible to the surface of the sprayed crop all the time (with the cabin 2 practically mounted on the boom 28). Another advantage is that during transport from field to field, the sprayer will have the minimum height and width, allowing a higher transport speed.

The monitor screen serves as an instrument panel and may have different views: device readings, boom and spraying management (FIG. 17), signalling and illumination, clearance and others. To economize time on changing views (pictures) it is possible to have two monitors. One of them will serve for devices reading and controlling the working process by means of videocameras and another for controlling all other functions of the sprayer. Such a design eliminates the need for a steering wheel and column, a conventional instrument panel, and considerably improves visibility for the operator and simplifies manufacture and assembly of the cabin 2.

The complex multi-sectional monotank 4 of saddle form according to the present invention can be made of plastic or stainless steel and has several separate compartments for the required liquids in its common body. This design of the tank permits significant simplification of the assembly of the sprayer and improves its appearance, because the saddle form of the tank will cover the sprayer frame, the boom inside it, and all communications between the cabin 2 and the engine 5.

Referring now most particularly to FIG. 22, tank 4 preferably has a hard outer shell 90, and contains a plurality of bladders 92, 94, 96 formed of a chemically resistant elastomeric material. Although three such bladders are shown, it is to be understood to be within the scope of this invention to have more or less numbers of bladders. Each bladder has a respective fill port 98a, 98b, 98c all of which are aligned with one of the hatches 100, 102 in the shell (FIG. 21). It is to be understood that each bladder can expand (or contract) to allow the maximum volume of the shell 90 to be utilized, while simultaneously adjusting the relative capacities of the bladders 92, 94, and 96. For example (and not by way of limitation) bladders 92, 94, 96 may fill the volume of shell 90 with a 25/25/50 percent ratio or may be expanded and contracted to a 30/30/40 percent ratio between the bladders while keeping the overall capacity of tank 4 substantially constant.

According to the present invention the sprayer can apply chemicals in accordance with the program of spraying (FIG. 20). The program of spraying (determined rate for determined area) is prepared on a diskette in advance and is based on results of soil analysis or yield monitoring. The automated system of programmed application of chemicals works as follows. The diskette with the program of spraying is inserted into the BK. After beginning of spraying the signals from the GPS and speed and flow sensors go to the BK through the I/O board. The present position of the sprayer is determined in accordance with the signal of the GPS, and then the requirements for this position are compared with the readings from the flow sensor. The signal of discordance from BK through the I/O board and RI goes to the electric valve of the flow control to increase or decrease the flow of chemicals to the boom. The speed sensor serves to compute the transport delay of the system and necessary flow to provide the required rate of spraying in accordance with the program.

The invention is not to be taken as limited to all of the details thereof as modifications and variations thereof may be made without departing from the spirit or scope of the invention.

What is claimed is:

1. A self-propelled automated sprayer comprising:
 a) a frame having a longitudinal axis;
 b) at least one boom wing for spraying chemicals and having at least one extendable and retractable extension movable along the longitudinal axis; and
 c) four wheels, each independently steerable for changing the direction of movement of the sprayer between parallel and perpendicular to the longitudinal axis such that the sprayer can move in directions parallel and perpendicular to the longitudinal axis.

2. The sprayer of claim 1 further comprising means to independently steer the wheels to allow the sprayer to pivot about an axis located between the wheels such that the one boom wing moves in an arc to spray a sector.

3. The sprayer of claim 1 further comprising a GPS receiver for determining a geophysical location of the sprayer.

4. The sprayer of claim 1 wherein the boom wing further comprises a breakaway mechanism to allow an outer part of the boom wing to deflect out of alignment with respect to the remainder of the boom wing in response to contact with an obstruction and return to alignment after moving past the obstruction.

5. The sprayer of claim 1 wherein the boom wing further comprises means for tilting an outer portion of the boom wing in a vertical plane.

6. The sprayer of claim 1 wherein the boom wing further comprises a cable and pulley apparatus to extend and retract the extension on the boom wing.

7. A self-propelled sprayer comprising:
   a) a longitudinal frame;
   b) a plurality of wheels supporting the frame and spaced longitudinally therealong; and
   c) a saddle tank mounted to the frame for carrying at least one chemical to be sprayed, wherein the saddle tank straddles and overhangs the frame in the space between the wheels.

8. A self-propelled sprayer comprising:
   a) a longitudinal frame; and
   b) a chemical tank mounted to the frame and having
      i) an outer shell of relatively rigid material, and
      ii) a plurality of bladders individually formed of elastomeric material to divide the tank into separate compartments while collectively filling the outer shell, with the relative capacities of the compartments being cooperatively adjustable
   such that the relative capacities of the compartments can be changed while utilizing substantially all the volume of the outer shell of the tank.

9. A self-propelled sprayer comprising:
   a) a longitudinal frame;
   b) a plurality of wheels, with at least one wheel carried by a pivotable steering assembly; and
   c) a suspension having a two bar linkage between the pivotable steering assembly and the frame and defining a parallelogram in a vertical plane
   such that the ground clearance of the sprayer can be adjusted by moving the frame vertically with respect to the wheel by changing the angle of the two bar linkage.

10. The sprayer of claim 9 wherein the suspension further comprises a fluid cylinder connected between the frame and one of the bars to control the angle of the two bar linkage.

11. The sprayer of claim 10 wherein the suspension further includes a lever between the cylinder and the frame against which the cylinder acts.

12. The sprayer of claim 9 further comprising a second wheel and suspension located transversely opposite the one wheel and wherein the suspension further comprises a pair of frame levers pivoted to the frame and a pair of fluid cylinders, with a respective one of the cylinders connected between one of the bars of the respective wheel linkages and one of the frame levers and further wherein a spring is located between the pair of frame levers.

13. The sprayer of claim 12 further comprising a shock absorber located in parallel with the spring between the pair of frame levers.

14. The sprayer of claim 12 wherein the wheel and suspension on one side of the frame can be adjusted to a different ground clearance from the wheel and suspension on the other side of the frame to allow the sprayer to traverse sloped terrain while remaining level.

15. A self-propelled automated sprayer comprising:
   a) a frame with a cabin fixed on it wherein the cabin includes
      i) a rotating operator seat,
      ii) an acceleration sensor,
      iii) an on-board computer with software,
      iv) a digital-analog interface I/O board,
      v) a relay interface,
      vi) a monitor having a screen,
      vii) a joystick, and
      vii) a GPS with satellite antenna on the roof of the cabin;
   b) fuel tanks placed under the cabin;
   c) a multi-sectional monotank of saddle-form;
   d) an engine with hydrostatic transmission and a block of electro-hydraulic valves;
   e) an air compressor with receiver and electric valve;
   f) four independent parallelogram lever suspensions mounted to the frame wherein each suspension includes
      i) two levers in an vertical plane pivotably fixed to the frame at one pair of ends thereof with the opposite ends thereof pivotably fixed to a vertical sleeve and further pivotably connected to a frame lever via a hydraulic cylinder for clearance changing wherein each cylinder has a position sensor associated therewith;
   g) four wheels, with each wheel carried by a steerable assembly having
      i) a fork connected to the vertical sleeve and carrying one of the wheels for rotation about an axis of rotation,
      ii) a hydrostatically driven motor in the fork, wherein each wheel has a separate mechanism and sensor for turning, and
      iii) a shield for each wheel, wherein a speed sensor is mounted on one of the steerable assemblies and an axis of symmetry of the steerable assembly coincides with the axle of wheel turning and crosses the axis of wheel rotation;
   h) a pneumatic spring with a pressure sensor and a shock-absorber for each pair of wheels fixed between the two frame levers;
   i) a telescopic boom having two wings, with an acceleration sensor for each wing of the boom, wherein the boom is mounted centrally between the wheels inside the frame of the sprayer;
   wherein the sensors of speed, wheels turning, the joystick, the on-board computer, the I/O board, the relay interface, the electric valves, and the mechanisms for turning the wheels are connected ii a system for turning and changing direction of movement;
   and further wherein the sensors of air pressure in air springs, speed, acceleration, clearance changing cylinder position, on-board computer, I/O board, relay interface, electric valves, receiver and air springs are connected in an automated system for suspension management;
   and further wherein the screen of the monitor through the on-board computer, the I/O board, the relay interface is connected with lights, turn signals, latches, and electric valves to form a system for management of the boom, ground clearance, foam marker signalling and illumination;

and further wherein sensors for pressure, temperature, volume, circuit, and position are connected by cables to the I/O board, the on-board computer and monitor to form a sprayer control system;

and further wherein the rotating operator chair has a mechanism for turning and is fixed on the floor of the cabin and arms of the chair are equipped with the monitor and the joystick and the on-board computer is installed under the chair seat;

and further wherein the telescopic boom has a middle nonmovable section divided along its longitudinal axis into two equal compartments, with two movable sections of the boom forming each of the two wings are placed in each of them and wherein each wing has a pulley-cable system mounted on its sections to pull them in and out by means of two hydraulic motors fixed on the nonmoving section, with each section of the boom equipped with a latch controlled by a solenoid and each outer section equipped with a break-away mechanism having two disengageable half-cylinder supports, a spring and a shock absorber, and wherein each of the intermediate movable sections is divided into inside and outside parts, upper girders of which are pivotably connected by means of a horizontal axle perpendicular to the axis of the section and an outside part of a lower girder is pivotably connected with two intermediate rods, the inside ends of which are pivotably connected with ends of a movable frame installed in the lower girder of the inside part in a guide and connected with the inside part of the intermediate section by means of a hydraulic cylinder;

and further wherein the GPS with the satellite antenna, a diskette with a program of applying chemicals, an electric valve of a flow control are joined through the on-board computer, the I/O board and the relay interface to form an automated system of programmed application.

16. The apparatus of claim 14 further comprising:

j) a videocamera fixed on the end of each wing and connected by a cable to a videocard installed in the on-board computer.

* * * * *

UNITED STATES PATENT AND TRADEMARK OFFICE
CERTIFICATE OF CORRECTION

PATENT NO. : 5,755,382
DATED : May 26, 1998
INVENTOR(S) : Andrey V. Skotnikov

It is certified that error appears in the above-indentified patent and that said Letters Patent is hereby corrected as shown below:

On title page, item [76] Inventors: delete "Skotinkov" and insert therefor --Skotnikov--

Column 10, line 23, delete "an" and insert therefor --a--

Column 10, line 53, delete "ii" and insert therefor --in--

Column 12, line 16, delete "14" and insert therefor --15--

Signed and Sealed this

Thirteenth Day of October 1998

Attest:

BRUCE LEHMAN

Attesting Officer

*Commissioner of Patents and Trademarks*